Patented July 20, 1954

2,684,366

UNITED STATES PATENT OFFICE 2,684,366

PREPARATION OF GUANAMINES

John Kenson Simons, Toledo, Ohio, assignor, by mesne assignments, to Allied Chemical & Dye Corporation, New York, N. Y., a corporation of New York No Drawing. Application April 27, 1949, Serial No. 90,038

10 Claims. (Cl. 260—249.9)

The invention relates to a novel method of preparing guanamines.

A guanamine is considered to be a derivative of a carboxylic acid in which a carboxy group is replaced by a 4,6-diamino-2-triazinyl radical. Many guanamines may be used in the same manner as melamine for reaction with formaldehyde to produce synthetic resins. Heretofore, guanamines have been obtainable only by methods that employ expensive starting materials or are difficult and expensive to carry out, so that guanamines have been too expensive for ordinary commercial use.

Guanamines have been prepared by the reaction of a biguanide with an acid chloride or an ester of a carboxylic acid, or by the reaction of cyanoguanidine with a nitrile. The starting materials in the former reaction are exceedingly expensive and the yields are found to be quite low. In contrast, cyanoguanidine is much less expensive than the relatively unstable biguanide, and nitriles are usually more readily available and less expensive than the corresponding acid chlorides or esters. However, the condensation reaction between a cyanoguanidine and a nitrile is a peculiar type of reaction which is not only extremely difficult to start but also spontaneous and extremely difficult to control once started. If the reaction is not carefully controlled, the guanamine yield is substantially reduced by the production of byproducts which are formed, particularly at high temperatures.

United States Patent No. 2,302,162 discloses the reaction, in solution, of dicyandiamide (cyanoguanidine) with a nitrile. However this patent teaches the use of a solvent medium for the reaction consisting of the reacting nitrile itself, which is used in substantial excess over the amount required stoichiometrically. The only solvent medium disclosed in the patent other than the reacting nitrile is diethyl benzene, and it has been found that the process in which diethyl benzene is used (page 1, column 2, lines 33–37 of the patent) is inoperable and does not yield the guanamine.

The process described in that patent in which an excess of nitrile is used as the solvent medium is unsatisfactory for several reasons; for example, the reaction does not start until the ingredients are heated approximately to the temperature of decomposition of cyanoguanidine; the reaction is extremely difficult to control once started; the maximum temperature of the reaction is limited by the boiling point of the specific nitrile used; substantial losses of the relatively expensive nitrile take place through byproduct formation and during repurification of the excess nitrile; and it is impossible to prepare a diguanamine (i. e., a guanamine which is a derivative of a dicarboxylic acid in which each of the carboxy groups is replaced by a 4,6-diamino-2-triazinyl radical).

The principal object of the invention is to provide a procedure for the preparation of guanamines in high yields, which is inexpensive and easily controlled. More specific objects and advantages are apparent from the accompanying description, which merely discloses and illustrates the invention and is not intended to impose limitations upon the claims.

The instant invention is an improved method of preparing guanamines by reacting a substance whose molecule contains a cyano radical attached to a saturated carbon atom with a cyanoguanidine having not more than one substituent, any such substituent being a monovalent aromatic hydrocarbon radical in the 1-position, characterized by the fact that the reaction is carried out in the presence of a strong base and of an alcoholic solvent whose molecule contains a hydroxy radical and a hydrogen atom attached to the same carbon atom, at a temperature from about 100° C. to about 210° C. In other words, if the preparation of a guanamine by reacting a nitrile with a cyanoguanidine is carried out in the presence of a strong base and a primary or a secondary alcohol at a temperature from about 100° C. to about 210° C., the reaction is easily controlled and an extremely good yield of the guanamine is obtained at low cost.

Since the instant invention is a process in which a nitrile reacts with a cyanoguanidine to produce a guanamine, of course the process is carried out under such conditions that an appreciable yield of a guanamine can be obtained; for example, the nitrile actually reacting with the cyanoguanidine must be a certain type of nitrile (within the group of nitriles which react with cyanoguanidines to produce guanamines) namely, a nitrile whose molecule contains a cyano radical attached to a saturated carbon atom. In other words, the carbon atom to which the cyano group is attached must not be olefinically unsaturated and must not become olefinically unsaturated under the reaction conditions. For the purposes of this invention a nuclear carbon atom in an aromatic ring structure (i. e., an atom in a benzene nucleus) is considered to be saturated.

A nitrile which cannot be used in the practice of the invention is a substance in which the carbon atom, to which the cyano group is attached, is connected by an olefinic unsaturated (double) bond to an atom which is capable of containing a double bond, such as a carbon, oxygen, sulphur or nitrogen atom. The most common examples of such compounds include acrylonitrile, maleonitrile and fumaronitrile. Also, the nitrile must not be a substance in which the cyano group is attached to a carbon atom which becomes unsaturated when subjected to the reaction conditions used in the practice of the invention. For example, the so-called "beta effect" is exhibited in the presence of a strong base by compounds containing a divalent sulphur or oxygen atom connected to two different atoms one of which is the beta carbon atom with respect to the cyano group in a cyanoethyl radical. These compounds are believed to decompose in the presence of a strong base to yield a substance which contains a cyano group attached to an unsaturated carbon atom. Examples of such compounds include bis-beta-cyanoethyl ether, bis-beta-cyanoethyl sulfide, bis-beta-cyanoethoxy ethane, cyanoethyl allyl ether, cyanoethyl alcohol, cyanoethyl acetate and cyanoethyl formal.

A mononitrile or polynitrile which is used in the practice of the invention may be the nitrile corresponding to a monocarboxylic acid or a polycarboxylic acid, for example, a normal aliphatic carboxylic acid in the series from acetic acid to octadecanoic acid, or in the series from malonic acid to octadecane 1,18-dicarboxylic acid, or a benzene carboxylic acid, or an aromatic carboxylic acid containing two condensed benzene nuclei or two benzene nuclei connected directly or connected by from one to twelve atoms in series, a satuated or unsaturated alicyclic carboxylic acid or an acid obtained by substituting in the molecule of any of the foregoing acids substituents such as aliphatic, cycloaliphatic, aromatic, alkoxy, aryloxy, acyl and sulfo ($-SO_3H$) radicals. Examples of such nitriles include acetonitrile, propionitrile, butyronitrile, valeronitrile, stearonitrile, succinonitrile, glutaronitrile, pimelonitrile, adiponitrile, sebaconitrile, azelaonitrile, octadecanedinitrile, benzonitrile, phthalonitrile, terephthalonitrile, cyanonaphthalene, dicyanonaphthalene, 2,4'-dicyanodiphenyl, 4,4'-dicyanodiphenyl methane, 4,4'-dicyanodiphenyl, 4,4'-dicyanodiphenyl ethane, 4,4'-dicyanoalpha, gamma-diphenyl propane, 4,4'-dicyanodiphenyl ether, 4-cyanophenyl 4-cyanobenzyl ether, 4,4'-dicyanodibenzyl ether, the ethers formed by the reaction of two molecules of a hydroxy benzonitrile (e. g., 4-hydroxy benzonitrile) with one molecule of the dibromide corresponding to a glycol in the series from methylene glycol to decylene glycol or to diethylene or triethylene glycol, gamma-methyl-gamma-acetylpimelonitrile, gamma-isopropenyl-gamma - acethylpimelonitrile, bis - cyanoethyl fluorene, 4,4'-dicyanobenzophenone, phenylacetonitrile, beta-sulfopropionitrile, gamma-cyano-gamma-phenylpimelonitrile and the dinitrile corresponding to the dimer of linoleic acid.

The invention is particularly well adapted for the preparation of certain diguanamines which heretofore could not be prepared at all or could be prepared only with great difficulty. Many of such diguanamines may be reacted with formaldehyde to produce synthetic resins having excellent properties, and such diguanamines may be obtained by carrying out the method of the invention using nitriles having the following general formula

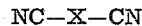

NC—X—CN wherein X is a divalent radical in which the shortest connection between the free valences is through not more than 18 carbon atoms in series and in which any atom other than carbon and hydrogen consists of an oxygen atom contained in an acetyl group; i. e., X is a divalent radical in which the shortest chain (or series of atoms) between the two free valences consists of not more than 18 carbon atoms. The preferred nitriles in this group are those which yield diguanamines having the best resin-forming properties, namely, the nitriles in which the radical X is a polymethylene radical such as a tetramethylene, pentamethylene or octamethylene radical.

Certain aromatic nitriles may be used in the practice of the invention to obtain particularly useful guanamines which may be reacted with formaldehyde to form resins soluble in organic solvents. Such nitriles include mononitriles such as benzonitrile, as well as dinitriles such as terephthalonitrile.

The cyanoguanidines which may be used in the practice of the invention are (unsubstituted) cyanoguanidine and any 1-substituted cyanoguanidine in which the substituent is a monovalent aromatic hydrocarbon radical having the free valence attached to a nucleus, having from one to two benzene nuclei, having from six to twelve carbon atoms, and having not more than two side chains consisting of alkyl radicals containing a total of not more than two carbon atoms. Such substituent may be a phenyl, tolyl, dimethyl phenyl, ethyl phenyl, naphthyl, methyl naphthyl, dimethyl naphthyl, ethyl naphthyl, or biphenyl radical. The most readily available compounds of this group include the 1-phenyl, the 1-(p-tolyl) and the 1-(m-tolyl) substituted cyanoguanidines.

The procedure of the instant invention is unique in that it is applicable to the preparation of guanamines which contain one or a plurality of 4,6-diamino-2-triazinyl radicals, e. g., to the preparation of a monoguanamine, diguanamine or triguanamine from the corresponding mononitrile, dinitrile or trinitrile. Although the preparation of a monoguanamine by reaction of a cyanoguanidine and a nitrile (preferably a mononitrile) may be carried out using widely different molal proportions, in the practice of the invention the preferred proportion ranges from about 1 mol to about 1.5 mols of the cyanoguanidine for each mol of the nitrile and the best results are obtained when the molal proportion is about 1.2 mols of the cyanoguanidine for each mol of the nitrile. In the preparation of a diguanamine, the preferred proportion ranges from about 2.2 to about 2.6 mols of the cyanoguanidine to 1 mol of the nitrile (e. g., a dinitrile) and the best results are obtained by using about 2.4 mols of the cyanoguanidine to 1 mol of the nitrile. Correspondingly, in the preparation of a triguanamine the preferred proportion of the cyanoguanidine used is slightly greater than 3 mols (i. e., about 3.6 mols) for each mol of the nitrile (i. e., the trinitrile).

The method of the instant invention is characterized by the fact that the reaction hereinbefore described is carried out in the presence of a strong base and an alcoholic solvent whose molecule contains a hydroxy radical and a hydrogen atom attached to the same carbon atom, at a temperature from about 100° C. to about 210° C. It has been found that when the reaction is carried out under the foregoing conditions there is a unique cooperation between the base and the alcoholic solvent, which causes the great improvement in the reaction obtained in the practice of the invention. The functions of the base and the alcoholic solvent are explained hereinafter.

The base used in the practice of the invention must be a strong base, i. e., a substance that is at least as strongly basic as potassium carbonate. Examples of such bases include sodium hydroxide in solid form or in solution, e. g., a 25 or a 50 per cent (aqueous) sodium hydroxide solution; potassium hydroxide in solid form (e. g., a commercial product consisting of about 85 per cent potassium hydroxide and about 15 per cent water) or in solution; a sodium alcoholate such as sodium methoxide, sodium ethoxide or sodium beta-methoxyethoxide (which is obtained simply by dissolving metallic sodium in methanol, ethanol or beta-methoxy ethanol, respectively); trimethylbenzyl ammonium hydroxide (available in a 30 per cent aqueous solution under the name "Triton B"); potassium carbonate; and sodium dicyandiamide. (The term "per cent," as used herein to refer to quantities of material, means per cent by weight unless otherwise qualified.)

A preferred strong base is a compound consisting of the substitution product of a substance with a labile hydrogen atom, having a dissociation constant (for the hydrogen) at least as small as about $3 \times 10^{-7}$, in which the labile hydrogen atom is replaced by a metal in group I of the periodic table having an atomic weight from about 23 to about 39, i. e., a sodium or potassium compound of a substance whose dissociation constant is equal to or less than that of carbonic acid. The maximum yields are obtained by using sodium dicyandiamide, although very high yields are also obtained by using potassium hydroxide in solid 85 per cent (aqueous) form, which is very inexpensive.

The proportion of the base which is used may range from the smallest amount which will cause an appreciable reaction (i. e., about 0.05 gram-equivalent of the base for each gram-equivalent of the nitrile) to an amount which causes the maximum practical speed of reaction (i. e., about 0.5 gram-equivalent of the base for each gram-equivalent of the nitrile). The number of gram-equivalents of the base ($x$) is calculated according to the following formula $$x = \frac{nw}{m}$$

wherein $n$ is the number of equivalents per mol, $w$ is the amount in grams of the base used and $m$ is the molecular weight of the base, and the number of gram-equivalents of the nitrile ($x_1$) is calculated according to the following formula $$x_1 = \frac{n_1 w_1}{m_1}$$

wherein $n_1$ is the number of reacting cyano radicals in the nitrile molecule, $w_1$ is the amount in grams of the nitrile used and $m_1$ is the molecular weight of the nitrile. A proportion ranging from about 0.1 to about 0.4 gram-equivalent of the base for each gram-equivalent of the nitrile is preferred since a practical reaction speed and a very high yield are obtained when the amount of base is within this range. In most cases, about 0.12 gram-equivalent of the base for each gram-equivalent of the nitrile is the optimum proportion at which the maximum yield is obtained, but in a few cases the proportion of the base used must be in the higher portion of the preferred range in order to obtain the maximum yield.

As hereinbefore mentioned, the alcoholic solvent which is present in the practice of the invention must be a compound whose molecule contains a hydroxy radical and a hydrogen atom attached to the same carbon atom, i. e., a primary or secondary alcohol. The preferred alcoholic solvent is one whose boiling point is in the range from about 100° C. to about 210° C. Examples of such solvents include beta-methoxy, beta-ethoxy or beta-butoxy ethanol, isoamyl alcohol, primary amyl alcohol, secondary amyl alcohol and benzyl alcohol, and mixtures thereof. The alcoholic solvent may be used alone or it may be diluted by as much as an equal volume of an inert solvent which is similar in physical properties, such as boiling point and compatibility with the reactants. In the preferred procedure, beta-methoxy ethanol is used as the alcoholic solvent. The amount of the solvent (or mixture of solvents including up to about 50 per cent of an inert solvent) which is used in the practice of the invention is usually from about two to four times the total weight of the other ingredients used (i. e., the nitrile, the cyanoguanidine and the base); however, the optimum amount of any specific solvent can be readily determined by one skilled in the art in carrying out the method of the invention since it is merely a matter of mechanical expediency, as can be seen from the detailed description of the procedure disclosed hereinafter, as a preferred procedure.

A vessel which is used in the practice of the invention may be of any material which is not corroded appreciably by the reactants, for example, a glass vessel in laboratory work or a stainless steel reactor in plant work. The vessel is equipped with an agitator, a reflux condenser and temperature control means for heating and for cooling the reactants.

All the ingredients used (i. e., the nitrile, the cyanoguanidine, the base and the solvent) may be charged into the reaction vessel at room temperature and heated slowly with continuous stirring until the reaction starts (usually at about 100–120° C.). The stirring may be continued during the entire reaction to maintain a uniform temperature throughout the reaction mixture and to avoid points of concentrated reaction in the mixture at which the temperature might rise above about 210° C. Usually the nitrile, the cyanoguanidine and the base dissolve in the solvent as the reaction mixture is heated (i. e., at about 75–90° C.), and therefore the solvent selected is used in an amount sufficient to so dissolve such ingredients. However, it is not necessary to dissolve all the ingredients before the reaction starts. For example, the reaction between glutaronitrile and cyanoguanidine usually starts before all of the cyanoguanidine has been dissolved.

In the practice of the invention, the reaction is carried out at a temperature from about 100° C. to about 210° C., preferably from about 100° C. to about 180° C. Ordinarily the reaction will not start at a temperature below about 100° C., and in some cases, it may be necessary to raise the temperature slightly above 100° C. in order to start the reaction. On the other hand, if the reaction is carried out at a temperature above about 210° C., the proportion of byproducts is increased substantially, and the guanamine yield is reduced accordingly. The optimum reaction temperature varies somewhat with the specific nitrile used, but it can be determined experimentally as the minimum temperature at which the reaction can be carried out at a practical rate of speed. In most cases, the optimum reaction temperature is in the neighborhood of the boiling point of beta-methoxy ethanol (124° C.).

In the preferred procedure, the reaction is carried out under reflux conditions. Since it is usually preferred to carry out the reaction under atmospheric pressure the alcoholic solvent preferably has a boiling point from about 100° C. to about 210° C. If certain of the ingredients are particularly difficult to dissolve or the reaction will not start readily, a high boiling solvent such as benzyl alcohol (B. P. 204.7° C.) may be used to obtain a high temperature under atmospheric pressure and the reaction may be carried out at a temperature below the boiling point of the solvent. If a nitrile is used that has a low boiling point, it may be necessary to carry out the reaction under pressure in order to obtain a sufficiently high temperature to cause the reaction to take place, and in such cases it may be practical to use an inexpensive alcohol whose boiling point is below about 100° C. at atmospheric pressure but above that temperature at the pressure used. In most cases, it would be less desirable to use an alcohol having a boiling point higher than 210° C., for example, by carrying out the reaction under reduced pressure so that the alcohol would boil at a temperature below about 210° C.

Although the reaction temperature is one of the principal factors which govern the rate of reaction, it has been found that certain nitriles react with the cyanoguanidine more rapidly than others under the same reaction conditions.

The reaction is exothermic, and in most cases, the start of the reaction is evidenced by the evolution of a great quantity of heat. Since a reaction temperature from about 100° C. to about 210° C. must be maintained, it is usually necessary to employ cooling means to prevent the temperature from going above the designated maximum temperature. In the preferred procedure, the heat is removed by refluxing the solvent, and the solvent can be selected according to its boiling point so as to boil at the optimum reaction temperature. If a high boiling solvent such as benzyl alcohol is used, and the desired reaction temperature is below the boiling point of the solvent, external cooling means, e. g., cooling coils, may be used to maintain the reaction temperature.

After the reaction has started the evolution of heat continues for a short period of time, and then decreases to such an extent that it is necessary to apply heat externally to maintain the reaction temperature and carry the reaction to completion. In the preferred procedure, the desired reaction temperature is maintained for two to five hours after noticeable evolution of heat has stopped.

In some cases the reaction proceeds so slowly that external heat must be added during the entire period of reaction in order to maintain the desired reaction temperature. If a comparatively low reaction temperature (i. e., the boiling point of beta-methoxy ethanol) is desired in such cases, it may be necessary to maintain the ingredients at the reaction temperature for a prolonged period of time (i. e., as much as 20-24 hours) in order to obtain a high yield.

Shortly after the reaction has started the guanamine begins to precipitate out of the solution, and the amount of solvent used in the preferred procedure is sufficient to permit thorough and continuous agitation of the reaction mixture, which becomes a sludge as the precipitation of the guanamine continues. Another reason for maintaining the reaction temperature for a substantial period of time after the reaction is apparently finished is that the guanamine in precipitating may remove some of the reactants from the solution and prolonged heating with agitation will cause such reactants to be redissolved.

After the reaction is completed, the mixture is cooled and the guanamine is removed, e. g., by filtration or by evaporation of the solvent. In the preferred procedure, the solvent selected is one in which the guanamine has minimum solubility. The guanamine is slightly soluble in most of the solvents used in the practice of the invention when hot but is practically insoluble in such solvents at room temperature.

The guanamine which is removed from the cooled reaction mixture is obtained in a relatively pure state. However, several procedures may be used to obtain an even purer form of the guanamine. For example, the guanamine may be washed with two to five times its weight of cold beta-methoxy ethanol or with two to ten times its weight of hot water in order to remove any melamine formed as a byproduct or any unreacted cyanoguanidine. Also, the guanamine may be recrystallized, e. g., by dissolving the guanamine in two to five times its weight of hot benzyl alcohol or hot beta-methoxy ethanol (so that any insoluble byproduct, such as melam or melon may be filtered out) and then crystallizing out the purified guanamine by cooling the filtrate.

The hydrochloride of the guanamine may be prepared simply by adding concentrated hydrochloric acid (in very slight excess of that stoichiometrically required) to the guanamine in an aqueous suspension. (One HCl molecule is found to be stoichiometrically equivalent to one 2,4-diamino-6-triazinyl nucleus.) The guanamine hydrochloride so prepared may be dissolved in hot water and recrystallized by cooling the water so as to obtain a pure guanamine hydrochloride, which can be easily neutralized with a base to yield a purified guanamine.

The general nature of the improvement obtained by the method of the instant invention and the performance characteristics of several strong bases used in the practice of the invention may be demonstrated by carrying out the following procedure:

A charge of 40.5 grams of cyanoguanidine and 21.6 grams of adiponitrile is added to a solution of 0.057 gram-equivalent of a strong base in 130 grams of beta-methoxy ethanol, in a one liter, 3-neck flask equipped with a mercury-sealed stirrer, an air inlet tube having a stop-cock and a reflux condenser. The charge is stirred and heated until spontaneous boiling begins by immersing the flask in an oil bath maintained at 130° C. When spontaneous boiling has ceased, the mixture is heated to continue the refluxing for a total of two and one-half hours, measured from the time when the flask was immersed in the oil bath. The flask is then removed from the oil bath and cooled to approximately room temperature. The precipitate is removed from the reaction mixture by filtration, washed with 60 grams of cold beta-methoxy ethanol, washed with 50 grams of water and then removed from the filter and boiled with 100 grams of water. The guanamine is removed from the hot water by filtration and washed with 50 grams of hot water and dried. The product so obtained is pure adipoguanamine.

Table 1 below shows the yields obtained by carrying out the foregoing procedure, and more specifically describes the procedure by which each yield is obtained by specifying the strong base used (column 1), the yield of the guanamine in grams (column 2) and in per cent based on the amount of nitrile used (column 3).

TABLE 1

| Catalyst (Col. 1) | Yield | |
|---|---|---|
| | grams (Col. 2) | percent (Col. 3) |
| 1. KOH, solid (85% aqueous) | 38 | 69 |
| 2. NaOH, solid | 36 | 65 |
| 3. NaOH, 50% aqueous solution | 38 | 69 |
| 4. NaOH, 25% aqueous solution | 33 | 60 |
| 5. Na (metallic) in beta-methoxy ethanol | 44 | 80 |
| 6. NaOCH₃ | 38 | 69 |
| 7. NaOCH₂CH₃ | 38 | 69 |
| 8. K₂CO₃ | 37 | 67 |
| 9. NaHNC(=NH)NHCN | 45 | 82 |
| 10. "Triton B" | 30 | 54 |

In the foregoing procedures the guanamine precipitate appears much more quickly when a solid catalyst is used than when a solution containing the base is used. Also a small amount of ammonia is given off during the reaction, and the maximum amount of ammonia is given off when water is present, i. e., added as solvent for the base.

Although it is not desired to limit the invention to any particular theory, it is believed that the reaction takes place according to the following equations:

(1) The cyanoguanidine loses a proton and becomes an anion in the presence of a strong base (e. g. NaOH) and the alcoholic solvent (represented by A—OH):

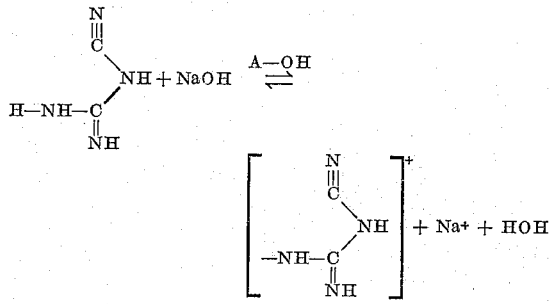

(2) The cyanoguanidine anion reacts readily with the cyano group in the nitrile (represented by B—C≡N) to form a group containing a triazine nucleus:

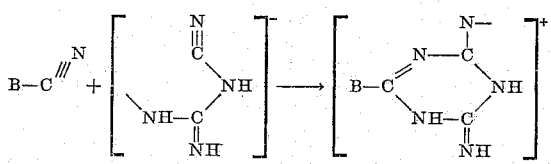

(3) The group containing the triazine nucleus is stabilized as a guanamine by accepting a proton from the alcoholic solvent:

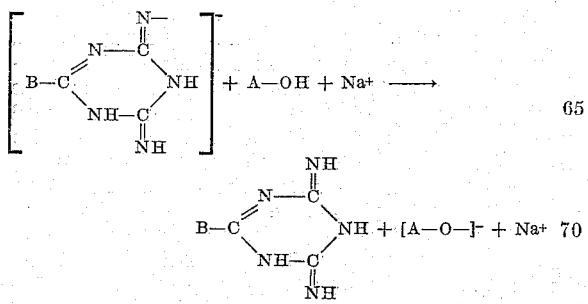

The foregoing theoretical explanation is supported experimentally by the facts that (a) a good yield of a guanamine can be obtained by carrying out a procedure that is the same as the procedure described hereinbefore except that both the cyanoguanidine and the strong base are wholly replaced by sodium dicyandiamide, (b) an alcohol such as tertiary amyl alcohol, which is not a proton donor, cannot be used successfully to replace the primary or secondary alcoholic solvent in the practice of the invention, and (c) the cyanoguanidine anion can be formed only if a strong base is present, and a weak base such as piperidine, triethanolamine or aluminum isopropoxide cannot be used successfully to replace the strong base in the practice of the invention.

The invention may be used in the preparation of numerous guanamines which are useful in a great number of arts. The practical as well as the economic advantages obtained in the practice of the invention are described in detail in the following examples, in which the guanamine yields are given in per cent by weight of the theoretical yield based on the amount of nitrile used.

*Example 1*

The invention may be used in the preparation of monoguanamines, diguanamines, triguanamines and mixtures thereof, according to the following procedures:

After the addition of 504 grams of cyanoguanidine and 500 grams of benzonitrile to a solution of 50 grams of 85 per cent (aqueous) potassium hydroxide in 1000 cc. of beta-methoxy ethanol, the ingredients are stirred and heated under a reflux condenser to 110° C. at which temperature the reaction starts and spontaneous boiling occurs. When spontaneous boiling has ceased, the mixture is heated to continue the refluxing for a total of five hours, and then the mixture is cooled. The precipitate which is formed during the foregoing reaction is filtered off, washed with hot water, and dried to produce an 82 per cent yield of benzoguanamine, which melts at 228° C. without decomposition. If the beta-methoxy ethanol in the filtrate is evaporated, benzoguanamine is obtained in an amount sufficient to increase the yield to 93 per cent.

After 3552 grams of cyanoguanidine and then 1600 grams of adiponitrile have been added to a solution of 300 grams of 85 per cent (aqueous) potassium hydroxide in 10,700 grams of beta-methoxy ethanol, the mixture is stirred and heated. A clear solution is formed at about 90° C. and exothermic reaction begins at about 100° C., which causes precipitation and raises the temperature to the boiling point of about 120° C. Refluxing is continued, with heating after the exothermic reaction subsides, for a total of five hours. After the mixture has been cooled, the solid is filtered off and washed once with cold beta-methoxy ethanol, once with cold water and twice with boiling water. The dry product is an 84 per cent yield of white, fluffy adipoguanamine, which is insoluble in hot or cold water, may be recrystallized from benzyl alcohol and melts at 295° C. with some decomposition. Adipoguanamine may be purified by dissolving it in hot dilute hydrochloric acid and then cooling to separate the solid hydrochloride so prepared, which does not melt when heated to 355° C. Purified adipoguanamine can be obtained by the addition of a base to a hot aqueous solution of the dihydrochloride.

After the addition of 51.6 grams of cyanoguanidine and 38 grams of gamma-cyano-gamma-phenylpimelonitrile to a solution of 18 grams of 85 per cent (aqueous) potassium hydroxide in 180 gram of beta-methoxy ethanol, the ingredients are stirred and heated under a reflux condenser. At 85° C. a clear solution forms and at 105° C. an exothermic reaction starts. Heating is continued so that the mixture is refluxed for a total of three hours, and then the mixture is cooled and neutralized with hydrochloric acid. The precipitate which is formed during the foregoing reaction is filtered off, washed with cold beta-methoxy ethanol, washed with boiling water, and dried to produce a yield of 46 grams of a mixture of gamma-2,4-diamino-6-triazinyl-gamma-phenylpimeloguanamine and a small proportion of diguanamines derived from the nitrile used.

*Example 2*

The invention may be used in the preparation of aryl guanamines, according to the following procedures:

After the addition of 40.3 grams of cyanoguanidine and 25.6 grams of phthalonitrile to a solution of 2.3 grams of sodium hydroxide and 1.6 grams of potassium hydroxide in 130 grams of beta-methoxy ethanol and 3 grams of water, the ingredients are stirred and heated under a reflux condenser until spontaneous boiling begins. When spontaneous boiling has ceased, the mixture is heated to continue the refluxing for a total of three to five hours. The precipitate which is formed during the foregoing reaction is filtered off, washed with hot water, and dried to produce a 32 per cent yield of phthaloguanamine, which melts at 345-350° C. without decomposition.

After the addition of 40.3 grams of cyanoguanidine and 25.6 grams of terephthalonitrile to a solution of 13 grams of 85 per cent (aqueous) potassium hydroxide in 130 grams of beta-methoxy ethanol, the ingredients are stirred and heated under a reflux condenser until spontaneous boiling begins. When spontaneous boiling has ceased, the mixture is heated to continue the refluxing for a total of three to five hours. The precipitate which is formed during the foregoing reaction is filtered off, washed with hot water, and dried to produce a 68 per cent yield of terephthaloguanamine, which melts at 382° C. without decomposition.

After the addition of 15.0 grams of cyanoguanidine and 15.3 grams of 4,4'-dicyanodiphenyl to a solution of 8 grams of 85 per cent (aqueous) potassium hydroxide in 80 grams of beta-methoxy ethanol, the ingredients are stirred and heated under a reflux condenser until spontaneous boiling begins. When spontaneous boiling has ceased, the mixture is heated to continue the refluxing for a total of three to five hours, and then the mixture is cooled and neutralized with hydrochloric acid. The precipitate which is formed during the foregoing reaction is filtered off, washed with hot waetr, and dried to produce an 86 per cent yield of p,p'-bis-2,4-diamino-6-triazinyl diphenyl, which melts at 390-392° C. without decomposition.

After the addition of 19.3 grams of cyanoguanidine and 17.0 grams of 1,2-dicyanonaphthalene to a solution of 8 grams of 85 per cent (aqueous) potassium hydroxide in 80 grams of beta-methoxy ethanol, the ingredients are stirred and heated under a reflux condenser until spontaneous boiling begins. When spontaneous boiling has ceased, the mixture is heated to continue the refluxing for a total of three to five hours, and then the mixture is cooled and neutralized with hydrochloric acid. The precipitate which is formed during the foregoing reaction is filtered off, washed with hot water, and dried to produce a 79 per cent yield of 1,2-bis-2,4-diamino-6-triazinyl naphthalene, which melts at 376-380° C. without decomposition.

Afetr the addition of 5 grams of benzonitrile and 4.2 grams of cyanoguanidine to 10 grams of benzyl alcohol in which has been dissolved 0.5 gram of 85 per cent (aqueous) potassium hydroxide, the mixture is warmed. By the time the temperature reaches about 120° C. heating is no longer necessary and exothermic reaction continues spontaneously for about fifteen minutes. The ingredients are then kept at about 135° C. by heating for one-half hour longer. Then after the mixture has been cooled the solid is filtered off and washed with benzyl alcohol to produce a crude product, which may be purified by boiling it with water and filtering it from the hot water. The purified product is obtained as a yield of 6.0 grams of benzoguanamine, which melts at 228° C. without decomposition.

After the addition of 100 grams of cyanoguanidine and 103 grams of benzonitrile to a solution of 10 grams of 85 per cent (aqueous) potassium hydroxide in 200 cc. of beta-methoxy ethanol, the ingredients are stirred and heated under a reflux condenser until spontaneous boiling begins. When spontaneous boiling has ceased, the mixture is heated to continue the refluxing for a period of five hours, and then the mixture is cooled. The precipitate which is formed during the foregoing reaction is filtered off, washed with hot water, and dried to produce a 70 per cent yield of benzoguanamine, which melts at 228° C. without decomposition. If the beta-methoxy ethanol in the filtrate is evaporated, benzoguanamine is obtained in an amount sufficient to raise the total yield to 92 per cent.

After the addition of 84 grams of cyanoguanidine and 117 grams of phenylacetonitrile to a solution of 8 grams of 85 per cent (aqueous) potassium hydroxide in 400 grams of beta-methoxy ethanol, the ingredients are stirred and heated under a reflux condenser until spontaneous boiling begins. When spontaneous boiling has ceased, the mixture is heated to continue the refluxing for one-half hour longer, and then the mixture is cooled. The precipitate which is formed during the foregoing reaction is filtered off, washed with methanol, and dried to produce a yield of 155 grams of phenylacetoguanamine, which melts at 245° C. without decomposition.

After the addition of 20 grams of cyanoguanidine and 22 grams of 4,4'-dicyanodiphenyl ether to a solution of 8 grams of 85 per cent (aqueous) potassium hydroxide in 80 grams of beta-methoxy ethanol and 50 grams of pyridine, the ingredients are stirred and heated under a reflux condenser until spontaneous boiling begins. When spontaneous boiling has ceased, the mixture is heated to continue the refluxing for three to five hours, and then the mixture is cooled and neutralized with hydrochloric acid. The precipitate which is formed during the foregoing reaction is filtered off, washed with hot water, and dried to produce a 49 per cent yield of p,p'-bis-2,4-diamino-6-triazinyl diphenyl ether, which melts at 290° C. without decomposition.

Other aromatic guanamines may be prepared by carrying out a procedure which is the same as that described in the foregoing paragraph except that the 4,4'-dicyanodiphenyl ether is replaced by a stoichiometrically equivalent amount of another dinitrile such as 2,4'-dicyanodiphenyl, 4,4'-dicyanodiphenyl methane, 4,4'-dicyanobenzophenone, 4,4'-dicyanodiphenyl ethane, 4,4'-dicyano-alpha, gamma-diphenyl propane, 4-cyanophenyl 4-cyanobenzyl ether, 4,4'-dicyanodibenzyl ether, or the ether formed by the reaction of two molecules of a hydroxy benzonitrile (e. g., 4-hydroxy benzonitrile) with one molecule of a dibromide corresponding to a glycol in the series from ethylene glycol to decylene glycol, or to diethylene or triethylene glycol.

*Example 3*

The invention may be used in the preparation of aliphatic guanamines, according to the following procedures:

After 15.4 grams of succinonitrile and 40 grams of cyanoguanidine have been added to a solution of 3.8 grams of 85 per cent (aqueous) potassium hydroxide in 83 cc. of beta-methoxy ethanol, the ingredients are heated under a reflux condenser until spontaneous boiling begins. When spontaneous boiling has ceased, the mixture is heated to continue the refluxing for three to five hours until precipitation is complete. The precipitate is filtered off, washed with boiling water, and dried to produce a quantitive yield of succinoguanamine, which is a white, insoluble solid that does not melt when heated to a temperature of 340° C., at which it shows signs of decomposition.

After 31 grams of glutaronitrile and 66 grams of cyanoguanidine have been added to a solution of 5.65 grams of 85 per cent (aqueous) potassium hydroxide in 150 cc. of beta-methoxy ethanol, the ingredients are heated under a reflux condenser until spontaneous boiling begins. When spontaneous boiling has ceased, the mixture is heated to continue the refluxing for two hours. The precipitate is filtered off, washed with cold water and then with boiling water, and dried to produce an 82 per cent yield of glutaroguanamine, which is a white solid that is insoluble in hot water, xylene, toluene, carbon tetrachloride, chloroform, dioxane or benzyl alcohol, and does not melt when heated to a temperature of 355° C., at which it begins to decompose.

After the addition of 363 grams of pimelonitrile and 602 grams of cyanoguanidine to a solution of 59.4 grams of 85 percent (aqueous) potassium hydroxide in 1940 grams of beta-methoxy ethanol, the mixture is refluxed with stirring for twelve hours, and then cooled and neutralized. The solid product is filtered off and washed with cold beta-methoxy ethanol, washed with hot water, and dried to produce an 89 per cent yield of pimeloguanamine, which melts at 253° C. without decomposition.

After the addition of 1000 grams of sebaconitrile and 1230 grams of cyanoguanidine to a solution of 130 grams of 85 per cent (aqueous) potassium hydroxide in 4500 grams of beta-methoxy ethanol, the mixture is refluxed with stirring for twelve hours. The solid product is filtered off and washed once with cold beta-methoxy ethanol, once with cold water and once with boiling water to produce a 77 per cent yield of sebacoguanamine, which is a white solid that is slightly soluble in hot water, is soluble in dilute hydrochloric acid, can be recrystallized from benzyl alcohol and melts at 271-273° C. with slight decomposition.

After the addition of 25 grams of azelaonitrile and 34 grams of cyanoguanidine to a solution of 0.8 gram of metallic sodium in 150 grams of beta-methoxy ethanol, the ingredients are stirred and heated under a reflux condenser. After refluxing the mixture for three hours a small amount (2.0 grams) of 85 per cent (aqueous) potassium hydroxide is added, and the refluxing is continued for twenty more hours. Then the mixture is cooled and neutralized with hydrochloric acid. The precipitate which is formed during the foregoing reaction is filtered off, washed with a small amount of hot water (in which it is slightly soluble), crystallized from beta-methoxy ethanol, and dried to produce a yield of 21 grams of azelaoguanamine, which melts at 218-219° C. without decomposition.

After the addition of 8.4 grams of cyanoguanidine and 10.8 grams of adiponitrile to a solution of 1 gram of 85 per cent (aqueous) potassium hydroxide in 40 grams of beta-methoxy ethanol, the ingredients are stirred and refluxed for one hour. The precipitate which is formed during the foregoing reaction is filtered off, washed with hot water and dried to produce a yield of 12.0 grams of delta-cyanovaleroguanamine, which melts at 290° C. without decomposition.

After the addition of 9.2 grams of cyanoguanidine and 5.5 grams of propionitrile to a solution of 3.0 grams of a 50 per cent aqueous sodium hydroxide solution in 30 grams of beta-methoxy ethanol, the ingredients are stirred and refluxed for 135 minutes. The precipitate which is formed during the foregoing reaction is filtered off, washed with hot water and dried to produce a yield of 2.5 grams of propioguanamine, which melts at 293-295° C. without decomposition.

If a procedure is carried out which is the same as that described in the foregoing paragraph except that butyronitrile (6.9 grams) is used instead of the propionitrile, the amount of the sodium hydroxide solution used is 3.2 instead of 3.0 grams, and the amount of beta-methoxy ethanol used is 32 instead of 30 grams, a yield of 3.0 grams of butyroguanamine (196° C. melting point) is obtained. Other guanamines may be obtained by carrying out a procedure which is the same as the foregoing except that the butyronitrile is replaced by a stoichiometrically equivalent amount of a mononitrile whose molecule contains as many as eighteen carbon atoms, e. g., dodecano-, tetradecano-, hexadecano-, or octadecano-nitrile.

*Example 4*

The invention may be used in the preparation of guanamines containing substituents on the guanamine ring structure or on the rest of the molecule, according to the following procedures:

After 8.0 grams of phenylcyanoguanidine and 2.7 grams of adiponitrile have been added to a solution of 0.75 gram of metallic sodium in 30 grams of beta-methoxy ethanol, the ingredients are refluxed for seven hours. When cool, the mixture is neutralized with hydrochloric acid and filtered. The solid diphenyladipoguanamine, upon recrystallization from beta-methoxy ethanol, gives a yield of 5.9 grams, which is about 60 per cent of the theoretical yield. The melting point is 232-235° C.

Other guanamines may be prepared by carrying out a procedure that is the same as that described in the foregoing paragraph except that the adiponitrile is replaced by a stoichiometrically equivalent amount of another nitrile, such as succinonitrile, glutaronitrile or sebaconitrile, or the phenylcyanoguanidine is replaced by a stoichiometrically equivalent amount of another hydrocarbon-substituted cyanoguanidine, such as p-tolylcyanoguanidine or m-tolylcyanoguanidine.

A solution of 288 grams of methyl ethyl ketone in 600 grams of tertiary butyl alcohol containing 20 grams of a 30 per cent methanol solution of potassium hydroxide is kept at a temperature between 0° and 5° C. and stirred for five hours during the drop-by-drop addition of 320 grams of acrylonitrile. An oily layer that separates soon solidifies. After two more hours of stirring at 5° C., the solid product is filtered off and air dried to produce an 88 per cent yield of gamma-methyl-gamma-acetylpimelonitrile. After 33.5 grams of this product and 33.5 grams of cyanoguanidine have been added to 75 grams of benzyl alcohol in which has been dissolved 2 grams of 85 per cent (aqueous) potassium hydroxide, the mixture is warmed. By the time the temperature reaches 130° C., heating is no longer necessary and exothermic reaction continues spontaneously for fifteen to twenty minutes. The ingredients are then kept at 140° to 160° C. by heating for two hours longer. Then, after the mixture has been cooled, the solid is filtered off and washed with alcohol to produce a crude product, which may be purified by boiling it with water and filtering it from the hot water. The purified product is a 65 per cent yield of a substance that is insoluble in water and soluble in a dilute acid and may be crystallized from benzyl alcohol, which is gamma-methyl-gamma-acetylpimeloguanamine.

A procedure is carried out which is the same as that described in the foregoing paragraph, except that the initial ingredients are 98 grams of mesityl oxide, 100 grams of tertiary butyl alcohol, 5 grams of a 30 per cent aqueous solution of trimethylbenzylammonium hydroxide, and 106 grams of acrylonitrile; the intermediate product is 66 grams of gamma-isopropenyl-gamma-acetylpimelonitrile; and the final ingredients are 51 grams of the intermediate product, 42 grams of cyanoguanidine, 5 grams of 85 per cent (aqueous) potassium hydroxide and 100 grams of benzyl alcohol. The final product is 45 grams of a substance that melts at 273-274° C., which is gamma-isopropenyl-gamma-acetylpimeloguanamine. The pimeloguanamines described in this and the foregoing paragraph are particularly interesting from an industrial point of view, not only because they are intermediates for the production of water-soluble synthetic resins, but also because the corresponding pimelonitriles may be obtained from inexpensive starting materials (i. e., acrylonitrile and a compound having an active methylene group).

A procedure is carried out which is the same as that described in the next to the last paragraph, except that the initial ingredients are 166 grams of fluorene, 500 grams of dioxane, 5 grams of a 30 per cent aqueous solution of trimethylbenzylammonium hydroxide, and 111 grams of acrylonitrile; the intermediate product is 60 grams of bis-cyanoethyl fluorene; and the final ingredients are 13.6 grams of the intermediate product, 8.4 grams of cyanoguanidine, 1 gram of 85 per cent (aqueous) potassium hydroxide and 20 grams of benzyl alcohol. The final product is a 62 per cent yield of bis-(4,6-diamino-2-triazinyl-ethyl) fluorene.

After 47 grams of sodium beta-cyanoethane sulfonate and 25 grams of cyanoguanidine have been added to 150 grams of beta-methoxy ethanol in which has been dissolved 1.4 grams of metallic sodium, the ingredients are stirred and refluxed for a total of four hours, and then the mixture is cooled and neutralized with hydrochloric acid. The precipitate which is formed during the foregoing reaction is filtered off. The precipitate so obtained is purified by dissolving 20 grams of such precipitate in water, adding 7.4 cc. of concentrated hydrochloric acid to the solution, heating the water to boiling, and filtering the undissolved material out of the hot water. The purified product, which is crystallized out by cooling the filtrate, is obtained as a yield of 18 grams of beta-sulfopropioguanamine, which does not melt at 410° C.

This is a continuation-in-part of application Serial No. 616,152, filed September 13, 1945, now Patent No. 2,510,761.

Having described the invention, I claim:

1. A process of preparing guanamines which comprises reacting dicyandiamide with a substance of the class consisting of aliphatic and homocyclic dinitriles in which each cyano radical is attached to a carbon atom of the class consisting of carbon atoms that are attached only to single bonds and carbon atoms that are contained in aromatic nuclei, in the presence of an alkali metal hydroxide, the reaction mixture being dissolved in an alcoholic solvent whose molecule contains a hydroxy radical and a hydrogen atom attached to the same carbon atom.

2. In the process of heat reacting a cyanoguanidine, in which any substituent is in the 1-position and is a monovalent aromatic hydrocarbon radical having the free valence attached to a nucleus, having from one to two benzene nuclei, having from six to twelve carbon atoms, and having not more than two side chains consisting of alkyl radicals containing a total of not more than two carbon atoms, and a hydrocarbon dinitrile in which each cyano radical is attached to a non-olefinic carbon atom which does not become olefinically-unsaturated under the conditions of the reaction, an improvement that comprises carrying out the reaction in the presence of a strongly basic catalyst and an alcoholic solvent whose molecule contains a hydroxy radical and a hydrogen atom attached to the same carbon atom.

3. In the process of heat-reacting cyanoguanidine and benzonitrile to produce benzoguanamine, an improvement that comprises carrying out the reaction in the presence of an alkali metal hydroxide catalyst and an alcoholic solvent whose molecule contains a hydroxy radical and a hydrogen atom attached to the same carbon atom.

4. In the process of producing a guanamine by heat-reacting a cyanoguanidine, in which any substituent is in the 1-position and is a monovalent aromatic hydrocarbon radical having the free valence attached to a nucleus, having from one to two benzene nuclei, having from six to twelve carbon atoms, and having not more than two side chains consisting of alkyl radicals containing a total of not more than two carbon atoms, and a nitrile having the formula $$N\equiv C-(CH_2)_x-C\equiv N$$

wherein $x$ is an integer not greater than 18, an improvement that comprises carrying out the reaction in the presence of an alkali metal base catalyst and an alcoholic solvent whose molecule contains a hydroxy radical and a hydrogen atom attached to the same carbon atom.

5. A process of preparing guanamines which comprises reacting cyanoguanidine with adiponitrile, in the presence of an alkali metal hydroxide, the reaction mixture being dissolved in beta-methoxy ethanol.

6. A process of preparing guanamines which comprises reacting cyanoguanidine with sebaconitrile, in the presence of an alkali metal hydroxide, the reaction mixture being dissolved in beta-methoxy ethanol.

7. A process of preparing guanamines which comprises reacting cyanoguanidine with gamma-methyl-gamma-acetylpimelonitrile, in the presence of an alkali metal hydroxide, the reaction mixture being dissolved in benzyl alcohol.

8. A process of preparing guanamines which comprises reacting cyanoguanidine with terephthalonitrile, in the presence of an alkali metal hydroxide, the reaction mixture being dissolved in beta-methoxy ethanol.

9. A process of preparing guanamines that comprises reacting (a) a cyanoguanidine, in which any substituent is in the 1-position and is a monovalent aromatic hydrocarbon radical having the free valence attached to a nucleus, having from one to two benzene nuclei, having from six to twelve carbon atoms, and having not more than two side chains consisting of alkyl radicals containing a total of not more than two carbon atoms, of the class consisting of cyanoguanidine phenylcyanoguanidine, p - tolylcyanoguanidine and m-tolylcyanoguanidine and (b) an aromatic nitrile of the class consisting of bis-cyanoethyl-fluorene, phthalonitrile, terephthalonitrile, 4,4'-dicyanodiphenyl, 1,2- dicyanonaphthalene, benzonitrile, phenylacetonitrile, 2,4'-dicyanodiphenyl, 4,4'-dicyanodiphenyl methane, 4,4'-dicyanobenzophenone, 4,4'-dicyanodiphenyl ethane, 4,4'-dicyano-alpha, gamma-diphenyl propane, 4-cyanophenyl 4-cyanobenzyl ether and 4,4'-dicyanodibenzyl ether, at 100°-210° C. and in the presece of (c) a strongly basic catalyst of the class consisting of an alkali metal hydroxide, an alkali metal in beta-methoxy ethanol, an alkali metal methoxide, an alkali metal ethoxide, an alkali metal carbonate, an alkali metal dicyanamide and trimethylbenzyl ammonium hydroxide in (d) a solvent therefor of the class consisting of beta-methoxy ethanol, beta-ethoxy ethanol, beta-butoxy ethanol, benzyl alcohol, isoamyl alcohol, primary amyl alcohol and secondary amyl alcohol.

10. A process of preparing guanamines that comprises reacting (a) a cyanoguanidine, in which any substituent is in the 1-position and is a monovalent aromatic hydrocarbon radical having the free valence attached to a nucleus, having from one to two benzene nuclei, having from six to twelve carbon atoms, and having not more than two side chains consisting of alkyl radicals containing a total of not more than two carbon atoms, of the class consisting of cyanoguanidine, phenylcyanoguanidine, p-tolylcyanoguanidine and m-tolylcyanoguanidine and (b) an aliphatic nitrile of the class consisting of gamma-methyl-gamma-acetylpimelonitrile, gamma isopropenyl-gamma-acetylpimelonitrile, beta-sulfopropionitrile, the dinitrile corresponding to the dimer of linoleic acid, succinonitrile, glutaronitrile, pimelonitrile, sebaconitrile, azelonitrile, adiponitrile, propionitrile, butylronitrile, dodecanonitrile, tetradecanonitrile, hexadecanonitrile and octadecanonitrile, at 100°–210° C. and in the presence of (c) a strongly basic catalyst of the class consisting of an alkali metal hydroxide, an alkali metal in beta-methoxy ethanol, an alkali metal methoxide, an alkali metal ethoxide, an alkali metal carbonate, an alkali metal dicyanamide and trimethylbenzyl ammonium hydroxide in (d) a solvent therefor of the class consisting of beta-methoxy ethanol, beta-ethoxy ethanol, beta-butoxy ethanol, benzyl alcohol, isoamyl alcohol, primary amyl alcohol and secondary amyl alcohol.

References Cited in the file of this patent

UNITED STATES PATENTS

| Number | Name | Date |
|---|---|---|
| 2,491,658 | Gresham | Dec. 20, 1949 |

FOREIGN PATENTS

| Number | Country | Date |
|---|---|---|
| 642,409 | Great Britain | Sept. 6, 1950 |
| 946,578 | France | Dec. 20, 1948 |

OTHER REFERENCES

P. B. Report No. 808, Office of Technical Service, Dept. of Commerce, Washington, D. C., 4 pp. spec.